United States Patent [19]

Fonseca

[11] Patent Number: 4,481,905
[45] Date of Patent: Nov. 13, 1984

[54] AQUARIUM WITH IMPROVED AERATOR AND PURIFIER

[76] Inventor: Oscar O. Fonseca, 3054-1/2 San Bruno Ave., San Francisco, Calif. 94134

[21] Appl. No.: 509,944

[22] Filed: Jul. 1, 1983

[51] Int. Cl.[3] .......................... A01K 63/04; E04H 3/20
[52] U.S. Cl. ........................................ 119/5; 210/169
[58] Field of Search ............................. 119/5; 210/169

[56] References Cited

U.S. PATENT DOCUMENTS

| | | | |
|---|---|---|---|
| 3,333,701 | 8/1967 | Scafuro | 210/169 |
| 3,483,985 | 12/1969 | Axelrod | 210/169 |
| 3,720,317 | 3/1973 | Willinger | 210/169 |
| 3,746,169 | 7/1973 | Willinger et al. | 210/169 |
| 3,770,128 | 11/1973 | Kast | 210/169 |
| 3,891,555 | 6/1975 | Bennett | 210/169 |
| 4,206,054 | 6/1980 | Moore et al. | 210/169 |
| 4,272,372 | 6/1981 | Fonseca | 210/169 |

Primary Examiner—Hugh R. Chamblee
Attorney, Agent, or Firm—Alfons Puishes

[57] ABSTRACT

An aquarium tank has positioned internally on its bottom a combined aerating and purifying cartridge containing suitable filtering media. An air supply is introduced in a dual direction to the interior of the cartridge creating an even circulating flow up a centrally fitted hollow stack positioned on the upper section of the cartridge and thereby creating a suction on the interior of the cartridge. This causes water in the aquarium to flow downward to the cartridge, carrying particles of impurities with it and then the flow is circulated through the inlet holes in the cartridge and thereafter through the filter media contained within it where the impurities are removed. The cartridge is readily removed through the top of the tank without disturbing a gravel bed in which it is positioned. The cartridge is surrounded by a perforated cylindrical retaining wall held in position by the surrounding gravel bed.

4 Claims, 3 Drawing Figures

AQUARIUM WITH IMPROVED AERATOR AND PURIFIER

BACKGROUND OF THE INVENTION

The problem of maintaining the purity of aquarium water and of supplying proper aeration in order to sustain marine life therein has occupied the attention of numerous inventors and a substantial number of patents have been issued. Circulating the water through suitable external filters is a common expedient which, of course, is accompanied by many practical problems and the supply of aeration or oxygen has been treated in various manners in the prior art.

Applicant has received U.S. Pat. No. 4,272,372 for his aquarium with aerator and purifier construction and has overcome the prior art which is cited therein.

The patents to Kast and Bennett, U.S. Pat. No. 3,770,128, U.S. Pat. No. 3,891,555, are closest to applicant's former and present invention, which were both overcome in the prior patent, so that the only and closest outstanding art is that of applicant's previous U.S. Pat. No. 4,272,372 mentioned above.

Basically, the problem is one of continuously removing the impurities from the water in the aquarium, supplying proper aeration, and providing for frequent and easy renewal or exchange of the purifying media. Also of great importance is the creation of a dormant area in which algae-like material of biological importance to the marine life can flourish.

My previous invention covered a global aquarium with the filtration medium located at the top of the globe and means for circulating the aquarium water through the filtration apparatus, aerating it at the same time and providing for easy access for removal of the filtration media and renewal of same.

There are numerous types and forms of aquarium filters. One type of filter device is the undergravel filter. In such filters, the filter is placed under the gravel bed, using the gravel as the filtering media. Such prior filters suffer from several disadvantages, one of which is the accumulation of waste and debris imbedded in the gravel and soon thereafter requiring the hobbyist to place his hands within the aquarium water to remove the gravel in order to wash and clean it. Further disadvantages in the washing of the gravel are that the necessary algae bacteria important to the chemical process that converts waste products into non-toxic matter is also washed out with the gravel wash.

Other types of aquarium filters are the corner filters which are placed over the gravel and cartridge filtration devices. These have tended to be bulky and cumbersome, particularly with regard to the replacement of the filter medium and use of glass wool when packed too tightly and thus preventing sufficient suction within the tank, particularly when the inlet holes are not close to the bottom of the aquarium tank. Under these conditions the filter is unable to lift or suck up the larger sediment that settles at the bottom of the tank. Such aquariums are covered by U.S. Pat. Nos. 3,720,318 to Cohen and 4,148,730 to Willinger.

SUMMARY OF THE INVENTION

In my present invention I utilize a specially constructed filtration cartridge which is positioned at the bottom of the aquarium and incorporates a retaining wall, a bed of gravel and a circulating system which utilizes the cartridge construction for purification and aeration and at the same time provides for easy renewal by replacement of the cartridge and its filter media positioned therein. In my cartridge I position filter media such as charcoal and glass wool and provide for an air circulating system which creates a suction, drawing the aquarium water down through the cartridge and the gravel bed, together with any suspended impurities, and provides the purification and aeration system simultaneously and the integrity of the cartridge for easy removal and replacement.

The cartridge is set in a bed of gravel from which it is separated by a cylindrical perforated retaining wall which keeps the gravel in position while the cartridge is being removed for replacement or cleaning. The gravel bed supplies the algae bacteria area necessary to the water and is kept free from contamination by the filter cartridge.

The air supply to the cartridge is two directional by way of an inverted cup into a vertical circulating tube creating a suction and establishing the circulation within the tank.

While I describe a spherical or global aquarium mounted on a ball bearing, an aquarium of other geometries utilizing the principles set forth in my subject application may be utilized.

DESCRIPTION OF A PREFERRED EMBODIMENT

Figure 1:
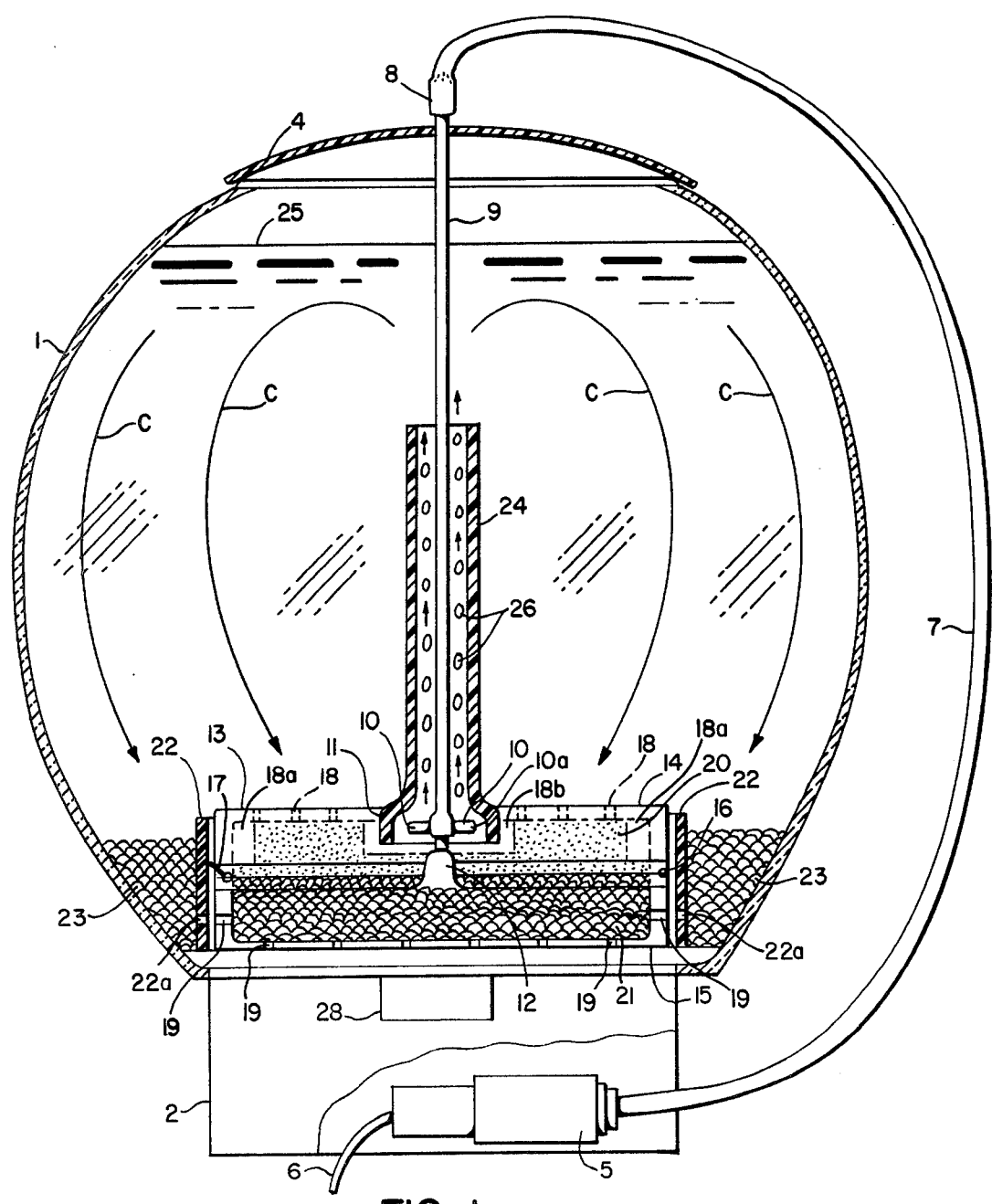
FIG. 1 is an elevation of my aquarium and since it is all constructed of glass or transparent plastic, all the elements are visible in the figure escept as noted.

Referring now to the figures, there is shown first the aquarium tank 1 which may be of spherical configuration but also may be square or rectangular, whichever way the user prefers. This is usually constructed of glass or a transparent plastic material is suitable if desired. The tank 1 is mounted on a hollow base 2 with a support 3 held in position upon base 2. A ball bearing 28 may be provided to facilitate rotation of the tank. The top of tank 1 is equipped with an easily removable cover 4 for access to the interior of the aquarium for cleaning purposes as described more fully below.

On the interior of base 2 there is located an air compressor 5 supplied with the power from an electrical source 6, not shown, and discharging air through supply tube 7 and thence connecting by means of removable slip joint 8 to a plastic air tube 9 located in the center of the aquarium and disposed for delivering air as required and disclosed below. At the bottom of plastic tube 9 is a fitting 10 in the form of a cross, the bottom end being blank and the side ends being open for the discharge of air. This cross member has openings 10a at its end which discharge air from the tube up against an inverted cup 11 to provide for circulation of the system. The bottom of tube 9 is supported in a receiving member 12 located below cross 10 which has a blind end and permits rotation within itself.

One of the principal components of my invention comprises a cartridge shown in assembly at 13 which comprises a top section 14 and a bottom section 15. These two sections are hinged together at hinge joint 16 and held in position by a latch mechanism 17, both of these are located within the cartridge.

The top section of my cartridge filter 14 is provided with holes 18 and the bottom section 15 is provided with holes 19. The bottom section 15 is concave inwards to conform with the bottom cavity of my tank 1. The aforementioned holes provide for the circulation of water through the filtration cartridge and consequently the filter media. The space 18a shows clearance provided between glass wool 20 and top section of cartridge 14 to facilitate circulation previously described and catch large particles before they get into charcoal bed 21.

Figure 3:
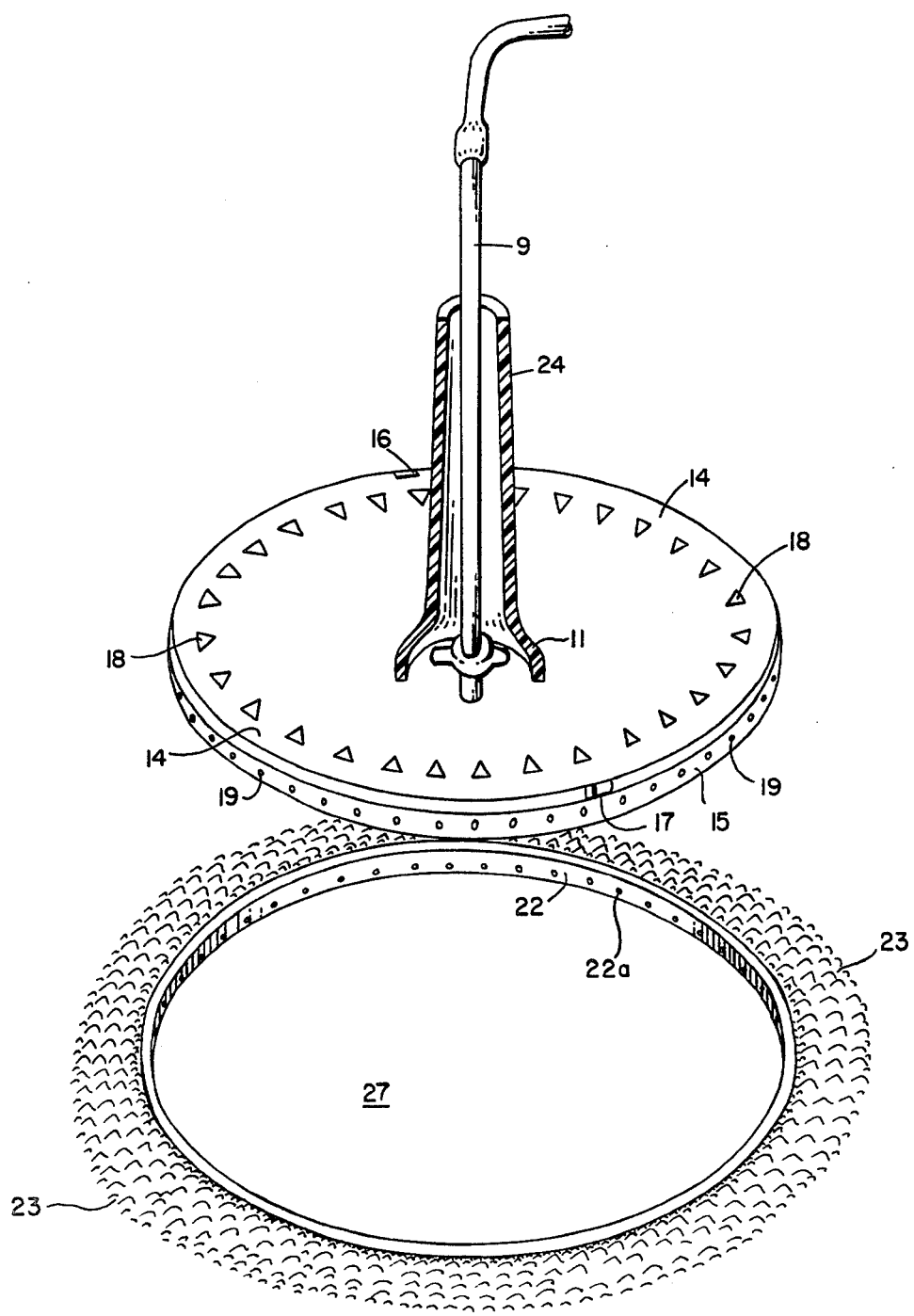
FIG. 3 is a diagrammatic representation illustrating the removal of the cartridge from the gravel bed and tank.

Inside the cartridge, the bottom section 15 is filled with charcoal 21 or a similar filtration medium and the top section 14 contains a spool of glass wool 20. My cartridge is surrounded by a cylindrical retaining wall 22 which is equipped with numerous perforated holes 22a in alignment with holes 19 to facilitate the water circulation through the gravel bed 23 and at the same time hold my cartridge inside the tank against the gravel bed 23. Outside this retaining wall I use a supply of gravel 23, the top of which is aligned with the top of the cartridge 14 and helps to hold the retaining wall 22 in position against my cartridge. A well 27 is formed when the cartridge 13 is removed from the tank as shown on FIG. 3.

An important element, as in my previous invention, is my circulating tube or stack 24 which connects to my inverted cup 11 to form a part of the circulating system which provides my dual air supply and dual flow through the cartridge and gravel bed as described below.

The water level in the aquarium tank is shown at 25, the air bubbles at 26 and the direction of water circulation is indicated by arrows "C".

OPERATION

The operation of my aquarium which should now be evident from the above description, is as follows:

Air from the air compressor 5 goes through the supply tube 7 and down to the central air tube 9 and discharges through opposite ends 10a of the cross member 10 and impinges upon cup 11. The air then travels in bubbles 26 up internal circulating tube of stack 24 and in so doing creates a suction on the surface of my filtration cartridge 13 and gravel bed 23. This causes water to travel downwards through holes 18 and gravel bed 23, causing the water to flow through the filtration media and at the same time provide aeration for the water inside the aquarium tank. The circulation of the water in the tank is indicated by the arrows "C" and has the aid of gravity in forcing impurities in the water down into the filter cartridge through holes 18 the gravel bed 23 and holes 22a and 19 upwards through charcoal bed 21.

This process continues until it is felt that the filtration cartridge 13 has been sufficiently contaminated with foreign matter. At this point, removable cover 4 is lifted after disconnecting slip joint 8 and the entire cartridge along with the air tube 9 is lifted from the aquarium tank without having to place hands into the aquarium water, and discarded or renewed if desired as shown on FIG. 3.

Figure 2:
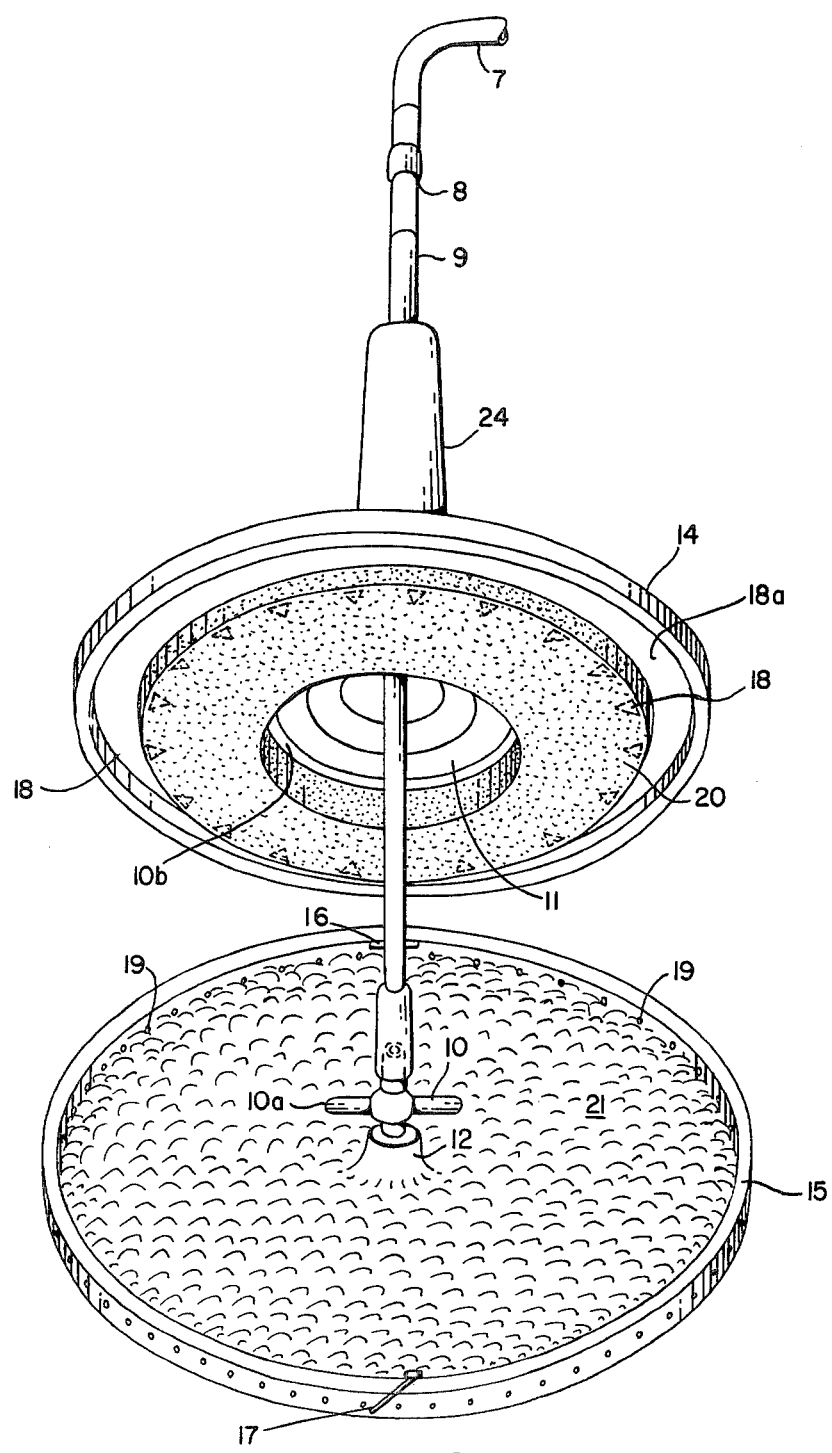
FIG. 2 is a diagrammatic exploded view of the cartridge shown partially in an open position exposing the internal filter media and other elements thereof.

Reference to FIG. 2 shows my cartridge in an open position and indicates the relative position of the parts described above, equivalent numbers indicating equivalent parts.

It is evident from the foregoing that the filtration and aeration operation is readily achieved and the replacement of the filtration media may be easily accomplished in the manner shown.

By use of my construction I can therefore, as is evident from the description above, very readily and conveniently renew the filtration media by removing the entire cartridge and replacing it with a new or replenished one without disturbing my gravel bed if desired, and without having to place my hands into the aquarium water. I thus eliminate the problems of cleaning or removing the gravel bed media which accompanies the aquariums previously built and at the same time provide adequate aeration and filtration.

I claim:

1. An aquarium tank having positioned within it upon its bottom a combined purifier and aerator comprising a cartridge and a gravel bed communicating therewith, said cartridge comprising:

an upper section and a lower section communicating with each other;

a plurality of holes through the top surface of said upper section;

a plurality of smaller holes through said lower section positioned around its periphery and adjacent to the bottom thereof;

a first filter medium positioned within said upper section;

a second filter medium positioned within said lower section;

a vertical hollow cylindrical stack positioned concentrically upon and communicating with said upper section;

a vertical tube positioned within said stack and having a cross-shaped member at its bottom projecting into said upper section;

a cup-shaped receptacle in the form of an inverted cup positioned within said upper section surrounding said cross-shaped member and communicating with said stack;

a source of compressed air introduced through said vertical tube;

said air being disposed to exit from holes in the end of said cross-shaped member and impinge upon the interior of said cup-shaped receptacle;

whereby an upward flow of air through said stack is created and a consequent suction is formed on the interior of said cartridge and said gravel bed;

thereby causing circulation of water downward in said tank and through said cartridge and simultaneously through said gravel bed;

said gravel bed comprising:

a perforated hollow cylindrical ring surrounding said cartridge in close proximity thereto;

a bed of gravel positioned between said ring and the interior wall of said aquarium tank;

means for permitting water flow from the lower part of said gravel bed to said second filter medium and upwards through said first filter medium and said vertical tube.

2. The aquarium of claim 1 in which said upper section and said lower section are in hinged relation to each other;

latch disposed to hold said sections in closed position and permit opening;

thereby providing access to the interior of said cartridge and to said filter media when desired.

3. The aquarium of claim 1 in which said second filter medium comprises a bed of charcoal and said first filter medium comprises a ring of glass wool surrounding said cup-shaped receptacle and filling the remaining space in said upper section.

4. The aquarium of claim 1 having:
a water tank of generally spherical configuration;
a rotatable mounting supporting said tank upon a base;
a ball bearing positioned within said base and disposed for facilitating the rotation of said tank.

* * * * *